(12) United States Patent
Elmaleh (10) Patent No.: US 8,730,872 B2
(45) Date of Patent: May 20, 2014

(54) SYSTEM AND METHOD FOR IDENTIFICATION OF MOBILE DEVICE USERS IN AN AREA OF A WIRELESS ACCESS POINT

(76) Inventor: David R. Elmaleh, Newton, MA (US)

( * ) Notice: Subject to any disclaimer, the term of this patent is extended or adjusted under 35 U.S.C. 154(b) by 142 days.

(21) Appl. No.: 13/018,606

(22) Filed: Feb. 1, 2011

(65) Prior Publication Data

US 2012/0195295 A1    Aug. 2, 2012

(51) Int. Cl.
*H04W 4/00* (2009.01)
*H04B 7/216* (2006.01)
*H04W 24/00* (2009.01)

(52) U.S. Cl.
USPC ........ 370/328; 370/335; 370/342; 455/435.2; 455/456.1

(58) Field of Classification Search
None
See application file for complete search history.

(56) References Cited

U.S. PATENT DOCUMENTS

| | | | | |
|---|---|---|---|---|
| 2008/0154899 | A1* | 6/2008 | Carmony | 707/6 |
| 2009/0061870 | A1* | 3/2009 | Finkelstein et al. | 455/435.2 |
| 2010/0210280 | A1* | 8/2010 | Haynes et al. | 455/456.1 |

* cited by examiner

*Primary Examiner* — Melanie Jagannathan
(74) *Attorney, Agent, or Firm* — Gregg P. Hart (57) ABSTRACT

A method and system for determining that a first mobile communication device that is part of a designated group is in a proximate location to a second mobile communication device that is part of such designated group, by comparing an identifier or a MAC address of an access point that is detected by the first device with an identifier or MAC address of an access point that is detected by the second device. If both devices detect a presence of a same access point, as is indicated by the MAC addresses of the access point, a signal is sent to at least one of the devices to indicate that the devices are in proximate locations.

20 Claims, 3 Drawing Sheets

SYSTEM AND METHOD FOR IDENTIFICATION OF MOBILE DEVICE USERS IN AN AREA OF A WIRELESS ACCESS POINT

FIELD OF THE INVENTION

The present invention generally relates to mobile communication devices, and particularly to providing notification to a user of a mobile device that one or more of a group of other users is in a proximate area.

BACKGROUND OF THE INVENTION

Various systems provide notification to a user that another user from among a group of users has joined or is present on a particular network or on a network application. Such a system may indicate to a first user that a second user is available on the network or on an application by providing identification of the second user to the first user, and for example, indicating that the second user is available to talk, chat or otherwise communicate on the network or over the application. The two users may in some cases be physically close or proximate, and be unaware that they could easily or readily meet face-to-face rather than communicate over a network or through an application. In some cases users may have arranged to meet in an area and may not have located each other in the area. Similarly they may have a desire to meet face-to-face with users in the group in other locations when traveling.

SUMMARY OF EMBODIMENTS OF THE INVENTION

Embodiments of the invention may include a method of alerting a mobile communication or computing device that another mobile communication or computing device is in a proximate location to its own location. Embodiments of the invention may include storing an indication that the first device is to receive a signal in an event that it is in a proximate location to the second device. Such indication may include for example a membership of each of the first device and the second device in a group that are to receive such notifications. A method may include comparing an access point identification data that is received by the first mobile communication device in a time period, to an access point identification data that is received by the second mobile communication device in the same period or some related period contiguous in a chronological period. The method may include transmitting from a remote computer such as a server to the first mobile communication device, some identification data of the second mobile communication device and an indication that the first mobile communication device and the second mobile communication device are in a proximate location.

Some embodiments of a method may include delivering a first collection of data to the remote computer or server, where such data may include for example an identifier of the first device, and a media access control address of the access point whose signal was received by the first device. A method may further include delivering a second collection of data to the remote computer that may include an identifier of the second mobile device and a media access control address of the access point whose signal is detected by the second mobile device.

Some embodiments of a method may include delivering the first and second collections of data over a wired network that is associated with the access point, or delivering the collections of data over a cellular or other wireless network that may be associated with one or more of the mobile devices.

Some embodiments of a method may include transmitting to a mobile communication device from the remote computer, location information of the second mobile communication device relative to the first mobile communication device, where such location information may have been collected from a global positioning system (GPS) or other automated location system.

Some embodiments of a method may include determining a position of the second mobile communication device relative to the access point; and determining a position of the first mobile communication device relative to the second mobile communication device.

Some embodiments of a method may include transmitting from the first mobile communication device to the second mobile communication device, an invitation for communication among the devices way of an access point or a cellular or other wireless network or connection.

Some embodiments of a method may include collecting, on a periodic basis, from each of the first mobile communication device and the second mobile communication device, a media access control address of an access point in whose reception area each of the respective mobile communication devices are located.

Some embodiments of a method may include transmitting a request to the first mobile communication device to allow the remote computer to transmit to the second mobile communication device an indication that the first mobile communication device and the second mobile communication device are in a proximate location.

Embodiments of the invention may include a method of alerting a first mobile communication device as to the presence of a second mobile communication device in a reception area of an access point. In some embodiments, the method may include collecting identification data of the first mobile communication device and identification information of the access point that is associated with or that is transmitting a signal in a time period to the first device. The method may include collecting identification data of the second mobile communication device and identification information of an access point associated in the time period with the second mobile communication device, and comparing the identification information of the access point detected by the first mobile communication device to the identification information of the access point associated with or detected in that time period with the second mobile communication device. A method may also include delivering a signal to the first mobile communication device as to a proximity of the second mobile communication device to the first mobile communication device.

Some embodiments of a method may include determining that a second device is in a pre-defined group of devices for which a signal is to be delivered to the first device as to the proximity of the second device to the first device.

Some embodiments of a method may include delivering location information of the second device where such location is relative to the first device.

Some embodiments of a method may include delivering identification information of a user of the second device.

Some embodiments of a method may include delivering a prompt to the first device that includes a request for a signal from the device to notify the second device as to the proximity of the second device to the first device.

Some embodiments of a method may include delivering a signal to the first device over a cellular network associated with the first device.

Some embodiments of a method may include delivering a prompt to the first device where such prompt includes a request for a signal from the first device to initiate a communication with the second device by way of the access point that associated with or detected by the first device.

Some embodiments of a method may include determining that an access point transmitting a signal to the first mobile communication device is in an area proximate to an access point transmitting a signal to the second mobile communication device.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "switching", "comparing", "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

As used in this application, and in addition to its regular meaning, the term "mobile transmitting device" may include for example, a cellular telephone, a tablet computer, laptop computer, netbook computer or other device having a processor, a memory, a transmitter and receiver as well as an input and output device such as a screen, keyboard, keypad, touch screen, microphone, speakers or other input and output device.

As used in this application, and in addition to its regular meaning, the term prompt, may include a signal to a user that may be generated by a local or remote processor and output via, e.g., a speaker, headphone, vibration device, screen, or monitor, where such signal requests that the user take an action such as executing an input, or responding to a question or request, where such respond may include an input to a computer or other input device.

As used in this application, and in addition to its regular meaning, the term "remote computer" may include a processor, memory or other device suitable to execute software instructions that may be associated with a remote device over a network such as a wired, wireless or other network.

As used in this application, and in addition to its regular meaning, the term "access point" (AP) or "wireless access point" may include one or more antennas suitable to wirelessly receive and/or transmit data such as packet data to and from one or more wireless devices such as mobile wireless communication, and to transmit such packets over a wired network. In some embodiments, a wireless access point may include for example a WiFi access point, a wireless local area network point, a access point using the Bluetooth or other standard for providing wireless connectivity to a network. In some embodiments, an access point may function on an IEEE 802.11 standard though other standards are possible. In some embodiments, an access point may provide to a mobile communication device, connectivity to a TCP/IP network, though connectivity to other networks may also be provided.

As used in this application, and in addition to its regular meaning, the term "proximate" may define a distance of one object to another object. In some embodiments proximate may refer to or be defined by the distance or area within a radius of a reception area of a single access point or to a set of access points that may be in a particular area such as an area where a reception or transmission area of one access point overlaps with a reception or transmission area of another access point. Such area may range from several tens of meters to several hundred meters or more. For example, devices in proximity to each other or in a proximate location to each other may be in the reception or transmission area of a same access point or one or more of the same set of access points.

An embodiment of the invention may be practiced through the execution of instructions such as software that may be stored on an article such as a disc, memory device or other mass data storage article. Such instructions may be for example loaded into a processor and executed on one or more computerized platforms. It will also be appreciated that while embodiments of the current invention are primarily described in the form of methods and devices, the invention may also be embodied, at least in part, in a computer program product as well as a system comprising a computer processor and a memory coupled to the processor, wherein the memory is encoded with one or more programs that may perform the functions disclosed herein.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Figure 1:
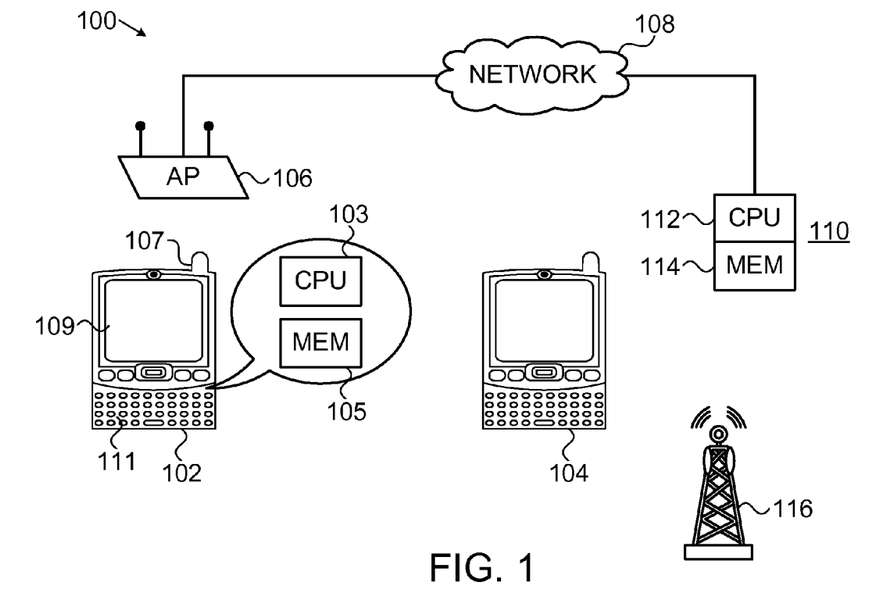
FIG. 1 is a schematic diagram of components of a system in accordance with an embodiment of the invention.

Reference is made to FIG. 1, a schematic diagram of components of a system in accordance with an embodiment of the invention. In some embodiments, system 100 may include a mobile communication device 102 that may have a processor 103, a memory 105, a receiver/transmitter that may be associated with an antenna 107, an input device 111 such as for example a keyboard or mouse, and output device(s) 109 such as screen and/or or other output device such as a loudspeaker. Memory 105 may include random access memory or other mass data storage capacity that may be suitable to record and store data as well as software or instructions that may be executed by processor 103. Device 102 may also include transmission and reception functions for wireless data whether over a cellular network, a TCPIP network or other networks. Memory 105 may also store a group of software modules that make up a client portion of a mobile application of system 100. Device 102 may include one or more software modules that may be stored for example on memory 105 and may be included in a program that may be executed by processor 103 such that it may be considered that processor 103 carries out the functionality of these or other modules described herein. In some embodiments, device 102 may periodically or in response to user prompts or other instructions, scan frequencies of electromagnetic signals to locate packets transmitted by one or more access points 106 in an area. When access point 106 is detected in an area, device 102 may transmit an acknowledgment packet to access point 106 and may in some embodiments, establish an association with access point 106.

Device 104 may include some or all of the functions, elements and capabilities that were described above with respect to device 102.

Access point 106 may also include a memory and a processor, and may provide device 102 and device 104 with access to network 108, such as the Internet. In some embodiments, access point 106 may be designated and store a media access control (MAC) address or other unique identification. Upon receiving communication data from for example device 102 or at other time periods, access point 106 may transmit such data to network 108 and may include its own unique identification data or MAC number in the transmission. Data transmitted from device 102 to network 108 by way of access point 106 may therefore include unique identification data of both device 102 and access point 106 with which may be associated or in whose reception area device 102 may be located. Access point 106 may on a regular or periodic basis, transmit data over network 108 that includes identification data of all the mobile communication devices that it detects in its reception area.

Server 110 may include or be associated or connected with one or more processors 112 and one or more mass data storage or memory 114 devices. In some embodiments, server 110 may store and execute a software module that includes an application that stores data identifying users or devices in groups that have consented to be alerted when such devices or users are in proximity of other users or devices on such list or in such group.

In operation, a user or device 102 may have consented to be included in a group of users or devices, and identification data of such users on the list may be stored in server 110. When device 102 is in a proximity or in a transmission and reception area of access point 106, one or more packets transmitted from device 102 that includes an identifier, such as a TCP/IP or other identifier of device 102, may be transmitted by access point 106 to network 108 along with a MAC address of access point 106. Server 110 may receive a transmission from device 102 by way of access point 106 over network 108 or over a cellular network, and may evaluate the MAC address associated with such transmission. Server 110 may compare the MAC address to a MAC address that was included in or associated with a transmission from device 104 or with other devices in the particular group. If the MAC addresses associated with transmissions from device 102 and 104 are the same server 110 may determine if users of devices 102 and 104 are in a same group that consented to be notified if another member of such group was proximate or in a vicinity to a member of the group. If a user of device 102 and device 104 are in the same group, server 110 may send a signal to one or both of device 102 and device 104 indicating that a member of such group is proximate or in a vicinity of one of such device 102 and device 104. Such signal may include identification data of a user of the proximate or near-by device, and/or a location of such device 104 relative to a location of device 102, or relative to some other object or coordinate.

In some embodiments, such a signal may include data about a user of the proximate or close-by device, such as a name, group of which he is a member, picture or other data such as date and time of the presence of the user in the area or location. Such a signal may also include a prompt asking one or both of the users of device 102 and device 104 if they wish to be identified to the other device, if they wish to communicate with the other device over a network or over a peer-to-peer communication protocol such as the Bluetooth protocol, or if they wish to meet a user of the other device. Other requests or prompts may be included in a signal sent to one or both of devices 102 and 104.

In some embodiments, the signal sent to device 102 indicating that device 104 is close-by may be sent over a cellular network from antenna 116. In some embodiments, such signal may be sent over a TCP/IP network from access point 106. In some embodiments, a signal may be sent over a network other than network 108, and other than by way of access point 106. For example, a signal to server 110 or from server 110 to device 102 or device 104 may be sent by way of a G3, G4, GSM, CDMA, WiFi, WiMax, 3GPP Long Term Evolution or other communication systems. In some embodiments, device 102 and device 104 may not establish an association with access point 106 at all, but may rather detect a signal from access point 106 and send a signal by way of another network such as a cellular network, that such signal was detected along with identification data of the access point that was detected.

In some embodiments, server 110 or device 102 may store, in for example memory 114 or memory 105, or another storage device, location data, such as location data provided by a GPS system to device 102, when such access point 106 is detected, and may transmit an association of the location data with the MAC address of the access point that was detected at a time when such location data was received by device 102. By storing location data in association with an access point MAC address, the system may determine a location of one or more access points that are close to access point 106, and may send signals to users that are in a reception area of such access points that are close to access point 106, as to the presence of users in a reception area of access point 106. A location of access points such as access point 106 may be loaded into tables, databases, or other storage systems that may be for example dynamically updated from other devices or from other servers, so that location information of access points in cities, neighborhoods, blocks or other divisions of areas may be downloaded and stored on device 102. In some embodiments, server 110 may update one or more tables or other storage structures on one or more devices 102 on a periodic basis as to the location of access points 106 in an area, and as to the location of devices 104 in an area of one or more of such locations near to device 102. In some embodiments, devices 102 may update a table of access point locations on server 110 on a periodic basis, and server 110 may on a periodic basis, update other devices 104 with location data of such access points and users in an area of such access points. Dynamic and updated tables may be exchanged by and among users 102 and 104 and server 110.

Figure 2:
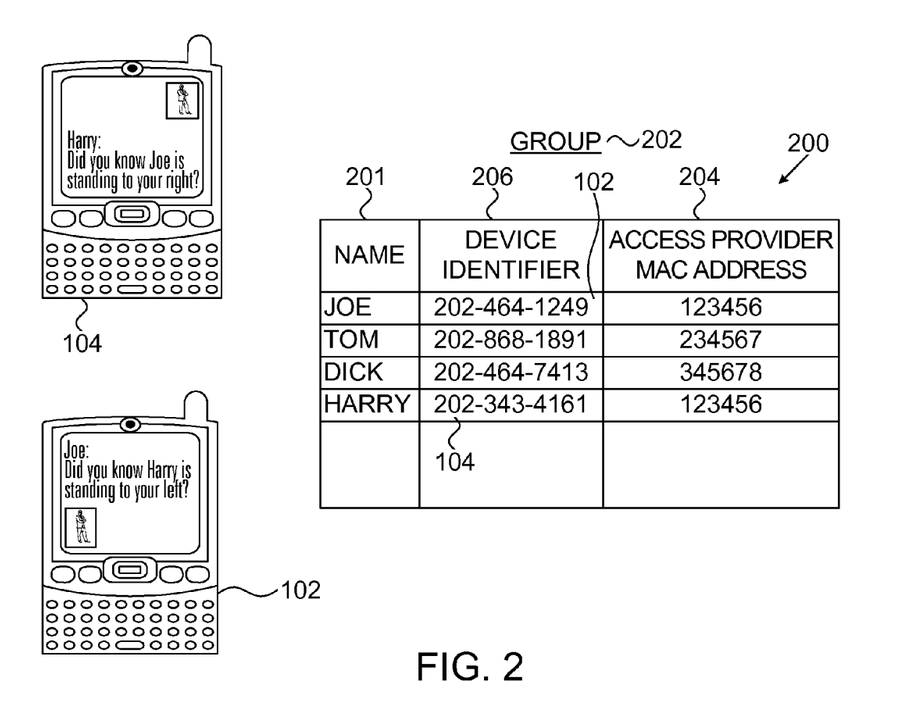
FIG. 2 is a schematic diagram of data collected and displayed, in accordance with an embodiment of the invention.

Reference is made to FIG. 2, a schematic diagram of data stored about a group of users of devices and MAC addresses associated with transmissions from each of such devices during a period of time, in accordance with an embodiment of the invention. Table 200 shows a list of user identification information such as names 201, email addresses or other identification data of a group 202 of users represented by their respective devices. Other or different identification data may be used. Devices in a group may also be associated in table 200 with one or more of a telephone number, subscribed identity module (SIM) number, MAC number or other identifier 206 by which the devices may be identified, associated or otherwise used to facilitate communication in a network association or communication. Such devices may at some time periods also be in an association or in communication with one or more access points 106, and such an access point 106 may be identified with a MAC address 204 or other identifier. In some embodiments, a device may not be in a communication association with access point 106, but may have detected or sniffed one or more packets transmitted by access point 106, thereby indicating that the device is in at least some nearby or proximate location to access point 106.

In some embodiments, an application that may for example be stored in device 102 in server 110 or in a combination of device 102 and server 110, or elsewhere, may transmit identification data of device 102 to server 110 over a cellular network or by way of network 108. Server 110 may compare MAC addresses 204 of access point 106 as were delivered to server 110 by device 102 that is a member of group 202, and transmit over cellular network or network 108, a message to device 102, showing that device 104 is proximate to, or in a reception area of the same access point 106. Such a message may include identification data of device 104, such as a name, date, time, telephone number, image or other data. Such a message may also include location data relative to access point 106 and or relative to device 102. A determination of the location of one or more of the devices may be made relative to the access points, and then such location of a first device may be calculated relative to the second device. Other methods of location determination are possible.

Some or all of such identification data and/or location data may be transmitted to appear on a screen or other display 109 of device 102. In some embodiments, when server 110 detects that two or more users or devices in a group are proximate to an access point 106 at a particular time, it may prompt one or more of the users or devices, and such prompt may request some input as to whether a first user wants the other user to know that they are in a proximate location during the time period. In some embodiments, a profile of a user of a prompting device 102 may appear on the prompted device 104. A prompt may include for example a name and image to allow for open consented communication. A user's image (e.g. thumbnail image) and name may appear on a device of consenting network members, and communications may be initiated by two or more users. Group 202 members may choose who they would like to prompt, such as a familiar friend, a potential date, a potential professional colleague etc., so that in the event such a member is present at a given time or at a future time in an area where device 102 is also present, a prompt will be sent to such other member of a group 202. In some embodiments, a location indication provided by for example a GPS system may appear on a prompt.

In some embodiments, mobile device 102 may on an occasional basis, such as when it is turned on, or at other times, receive and store its own location coordinates from for example a GPS system or from other sources. Mobile device 102 may on an occasional basis, such as when it is turned on, or at other times, also sniff to detect Wi-Fi or other access points 106 in an area, and may transmit signals that include both its own location and detected access point 106 data to server 110, along with an association of its location coordinates with the detected access point 106. Server 110 or some other component may create and store a list of access points and their associated locations.

Server 110 may poll access points at various periods to learn which devices are then proximate to it. Alternatively, an application on device 102 may periodically transmit to server 110 its own identification data and identification data of the access point 106 which it may have detected.

In some embodiments, server 110 may store data on a location of one or more access points, and may indicate that a first device is in a reception area of a first access point, and a second device is in a reception area of a second access point, and that the two access points are close to each other.

In some embodiments, server 110 or device 102 may transmit to other devices a map or other description of its own location and the relative or absolute location of other devices in a group. For example, several members of a group who may be attending for example a conference, may be capable of keeping track of a location of their colleagues at the conference via the devices associated with the members. In some embodiments, a user of mobile device 102 may download a list of users in his group or in other groups, and alert them as to his location (the location of his device). In some embodiments, a profile of a user of device 102 or of other devices 104 in an area may be inserted or downloaded from device 102 or from server 110, subject in some embodiments to a consent of a user of such other devices.

Figure 3:
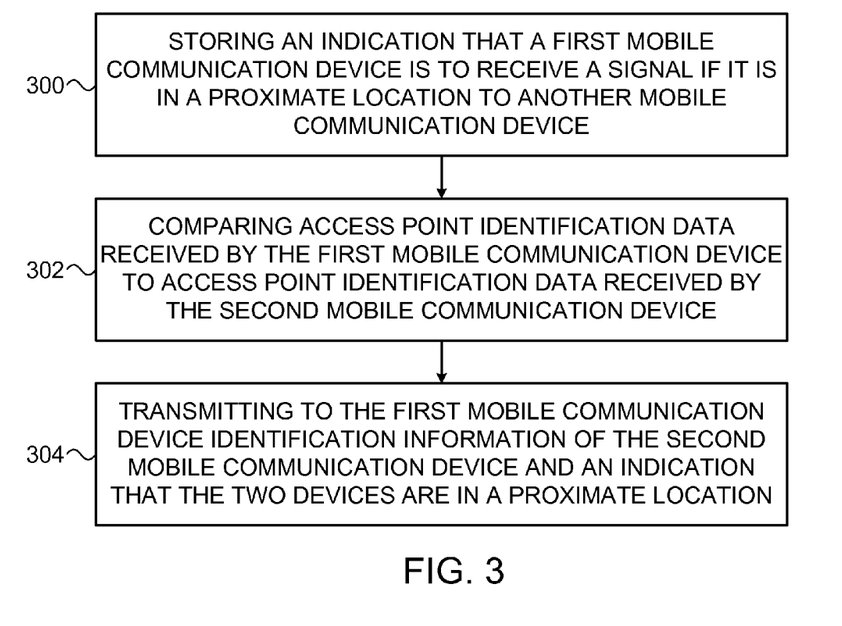
FIG. 3 is a flow diagram of a method of in accordance with an embodiment of the invention.

Reference is made to FIG. 3, a flow diagram of a method in accordance with an embodiment of the invention. Some embodiments of the invention may alerting a first mobile communication device (or a user of the device) that a second communication device (and thus, likely, a user of the device) is nearby or in a proximate location of a second mobile communication device during or in a particular time period, where such proximate location may include or be defined by a reception range of an access point or a set of access points.

In block 300, an indication that the first mobile communication device is to receive a signal, such as an alert or message, may be stored, in an event that the first mobile communication mobile device and another mobile communication device are in a proximate location relative to each other or relative to one or more access points. In some embodiments such indication may include a prior sign-up or consent of both of the communication devices in a group (or their users), thereby indicating a desire or consent to be alerted to the proximate presence of another mobile communication device that may for example also be in the group. In some embodiments, such a group may include or be defined by a social network or friends in such network. Such consent may have included an instruction that may at one time have been given to an application, to indicate by way of a message or signal to the device that a second mobile communication device is in a proximate location during or at such time period.

In block 302, a processor, such as a processor in a remote server, or in one of the mobile devices that may receive a signal from a mobile device, may compare access point identification data received by the mobile device from an access point in a transmission area of the first mobile communication device in the relevant time period, to access point identification data received from an access point by the second mobile communication device in the time period. If the comparison indicates that the two devices have detected an identifier of the same access point during a given time period, it may be taken as an indication that the devices are in a proximate location since they have detected a signal from the same access point.

In block 304, a server or other device may transmit to the first mobile communication device some identification information of the second mobile communication device and an indication that the first mobile communication device and the second mobile communication device are in a proximate location. The server may prompt or otherwise invite a user of the device to indicate whether he wants to contact the second device or otherwise indicate to the user of the second device of his own presence in the location. A signal may include a picture or other image data that may represent a user of a device, as such image data may have been previously stored in, for example, a server.

In some embodiments, delivering a mobile communication device may include delivering data to the remote server that includes the device's own identification data and a MAC address of one or more of the access points that the device detected.

Signals and data to and from a device and to and from a server may be transmitted over the network to be which the access point is connected or over a cellular network to which the device may be connected, or over combinations of networks.

Figure 4:
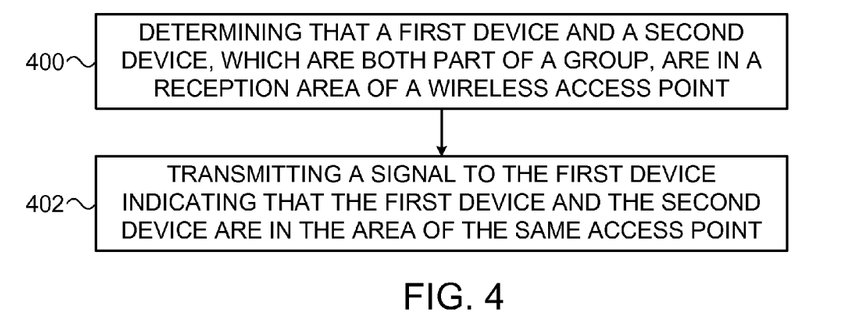
FIG. 4 is flow diagram of a method in accordance with an embodiment of the invention.

Reference is made to FIG. 4, a flowchart of a method in accordance with an embodiment of the invention. Some embodiments may include indicating that a first mobile communication device is in a proximate location to a second mobile communication device. In such embodiment, as is shown in block 400, a processor may determine that the first device and the second device, which are both part of a group that is designated in a memory associated with the processor, are in a reception area of a single wireless access point, or are in proximity to each other. In block 402, if the first and second devices are in a reception area, a processor may transmit a signal to the first device indicating that the first device and the second device are in the area of the same access point, and may transmit to one of such devices some identification information of the second device.

Figure 5:
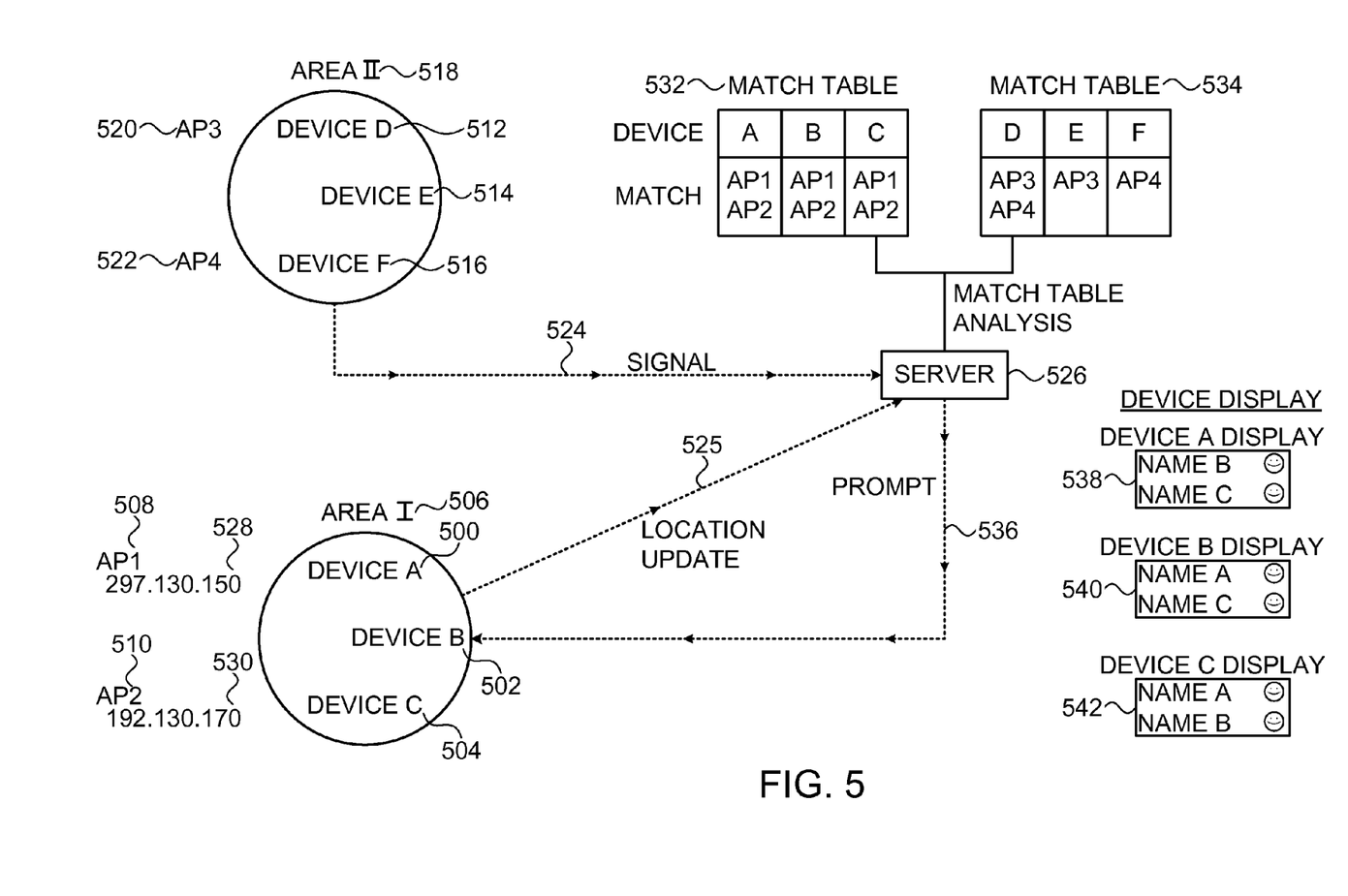
FIG. 5 is a schematic diagram of a system in accordance with an embodiment of the invention.

Reference is made to FIG. 5, a schematic diagram of a system in accordance with an embodiment of the invention. In some embodiments, devices such DeviceA 500, DeviceB 502 and DeviceC 504 may be located in Area 1506 which may be in a reception area of Access Point (AP)1 508 and AP2 510. The devices may be in proximity to each other. Such devices may have been included in a pre-defined group that may have requested that they be alerted in the event that any or all of them were in a same location. DeviceD 512, DeviceE 514 and DeviceF 516 may be located in Area II 518 which may be in a reception area of AP3 520 and AP4 522; these devices may be in proximity to one another.

In some embodiments, some or all of DevicesA 500 through DeviceF 516 may transmit signals 524 to server 526, and such signals 524 may indicate for example a MAC address 528 or 530 of the AP whose signal such devices may have received. Such signals may be transmitted over various networks such as for example GS3, GS4, ISDN or other, and may include location data 525 such as may be provided by for example a global positioning satellite system.

Server 526 may construct one or more data structures such as match tables 532 and 534 for one or more of the groups of devices, and match tables 532 and 534 may include one or more groups of users who have indicated a desire to be updated as to their location matches. For example, match table 532 may indicate that match of MAC addresses by all of the devices in such table. Match table 534 may indicate that one pair of devices in a group receive signals from AP3 520, and another pair receive signals from AP4 522, and that one device in each of such pairs receives signals from both AP3 520 and AP4 522, thereby indicating that DeviceD 512, DeviceE 514 and DeviceF 516 may be in contiguous proximate locations.

Server 526 may collect the results of match table analysis and transmit signals 536 to on one or more of DeviceA 500, DeviceB 502 and Device 504, that may include a prompt to such users of such devices to take some action or input a signal to indicate their wish to acknowledge their location to another member of their group in their respective locations.

The prompt signals 536 may cause a display 538 of Device A to show for example one or more of a name, location, time, and image of each of users of deviceB 502 and DeviceC 504. Similarly, display 540 of Device B may show such data about a user of DeviceA 500 and DeviceC 504, and display 542 of Device C 504 may show such information about a user of DeviceA 500 and DeviceB 502.

It will be appreciated by persons skilled in the art that embodiments of the invention are not limited by what has been particularly shown and described hereinabove. Rather the scope of at least one embodiment of the invention is defined by the claims below.

I claim:

1. A method of alerting a first mobile communication device when a second mobile communication device is in a proximate location to said first mobile communication device, the method comprising:
    determining, without using a global positioning system (GPS), a first position of said first mobile communication device relative to a first access point;
    determining a second position of said second mobile communication device relative to said first access point;
    determining said proximate location of said second mobile communication device relative to said first mobile communication device based on said first and second positions;
    storing an indication that said first mobile communication device is to receive a signal if said first mobile communication mobile device and said second mobile communication device are in said proximate location to said first access point;
    comparing access point identification data received by said first mobile communication device in a time period, to access point identification data received by said second mobile communication device in said time period;
    transmitting from a remote computer to said first mobile communication device, identification information of said second mobile communication device and an indication that said first mobile communication device and said second mobile communication device are in said proximate location to said first access point.

2. The method as in claim 1, comprising:
    delivering a first collection of data to said remote computer, said first collection of data comprising:
        an identifier of said first device, wherein the identifier of said first device at least comprises a media access control (MAC) address, and
        a media access control address of said first access point; and delivering a second collection of data to said remote computer, said second collection of data comprising:
an identifier of said second mobile device, and
said media access control address of said first access.

3. The method as in claim 2, wherein:
said delivering said first collection of data comprises delivering said first collection of data over a wired network associated with said first access point; and
said transmitting from said remote computer to said first mobile communication device comprises transmitting over a cellular network.

4. The method as in claim 1, comprising transmitting to said first mobile communication device from said remote computer, proximity location information of said second mobile communication device relative to said first mobile communication device.

5. The method as in claim 1, further comprising transmitting from said first mobile communication device to said second mobile communication device, an invitation for communication among said first mobile communication device and said second mobile communication device by way of said first access point.

6. The method as in claim 1, wherein said identification information of said second mobile communication device comprises image information of a user of said second mobile communication device.

7. The method as in claim 2, further comprising collecting, from each of said first mobile communication device and said second mobile communication device, said media access control address of said first access point.

8. The method as in claim 1, comprising transmitting a request to said first mobile communication device to allow said remote computer to transmit to said second mobile communication device an indication that said first mobile communication device and said second mobile communication device are in said proximate location.

9. A method of alerting a first mobile communication device as to the presence of a second mobile communication device in a reception area of an access point, comprising:
collecting identification data of said first mobile communication device and identification information of said access point that is associated in a time period with said first device, wherein said identification data of said first mobile communications device at least comprises a media access control (MAC) address;
collecting identification data of said second mobile communication device and identification information of an access point associated in said time period with said second mobile communication device;
comparing said identification information of said access point associated in said time period with said first mobile communication device to said identification information of said access point associated in said time period with said second mobile communication device;
delivering a signal to said first mobile communication device as to a proximity of said second mobile communication device to said first mobile communication device; and
wherein a global positioning system (GPS) is not used to determine if said second mobile communication device is within said reception area of said access point.

10. The method as in claim 9, comprising determining that said second device is in a pre-defined group of devices for which said signal is to be delivered to said first device as to said proximity of said second device to said first device.

11. The method as in claim 9, wherein said delivering said signal comprises delivering location information of said second device relative to said first device.

12. The method as in claim 9, wherein said delivering said signal comprises delivering identification information of a user of said second device.

13. The method as in claim 9, comprising delivering a prompt to said first device, said prompt including a request for a signal from said device to notify said second device as to said proximity of said second device to said first device.

14. The method as in claim 9, wherein said delivering said signal comprises delivering said signal to said first device over a cellular network associated with said first device.

15. The method as in claim 9, comprising delivering a prompt to said first device, said prompt including a request for a signal from said first device to initiate a communication with said second device by way of said access point associated in said time period with said first device.

16. A computer software product that includes a non-transitory computer medium readable by a processor, the medium having stored thereon a plurality of instruction sets comprising:
a first instruction set which when loaded into a memory and executed by the processor causes the processor to determine a first position of a first mobile communication device relative to a first access point;
a second instruction set which when loaded into said memory and executed by the processor causes the processor to determine a second position of a second mobile communication device relative to said first access point;
a third instruction set which when loaded into said memory and executed by the processor causes the processor to determine a proximate location of said second mobile communication device relative to said first mobile communication device based on said first and second positions;
a fourth instruction set which when loaded into said memory and executed by the processor causes the processor to store an indication that said first mobile communication device is to receive an indication that said first mobile communication mobile device and a second mobile communication device are in said proximate location;
a fifth instruction set which when loaded into said memory and executed by the processor causes the processor to compare identification data of said first access point, as such identification data was received by said first mobile communication device in a time period, to identification data of said first access point received by said second mobile communication device in said period;
a sixth instruction set which when loaded into said memory and executed by the processor causes the processor to transmit from a remote computer to said first mobile communication device, identification information of said second mobile communication device and an indication that said first mobile communication device and said second mobile communication device are in said proximate location, wherein a global positioning system (GPS) is not used to determine the proximate location between the first and second mobile communication device.

17. The computer software product as in claim 16, wherein said plurality of instruction sets further result in transmitting from said first mobile communication device to said second mobile communication device, an invitation for communication among said first mobile communication device and said second mobile communication device by way of said first access point.

18. The computer software product as in claim 16, wherein said plurality of instruction sets further result in transmitting to said first mobile communication device, image information of a user of said second mobile communication device and a media access control (MAC) address of said second mobile communication device.

19. The computer software product as in claim 16, wherein said plurality of instruction sets further result in determining that said first access point transmitting a signal to said first mobile communication device is in an area proximate to a second access point transmitting a signal to said second mobile communication device.

20. The computer software product as in claim 16, wherein said plurality of instruction sets further result in transmitting from said first mobile communication device to said remote computer a location coordinate of said second mobile device and said identification data of said first access point.

* * * * *